Figures 1, 2:
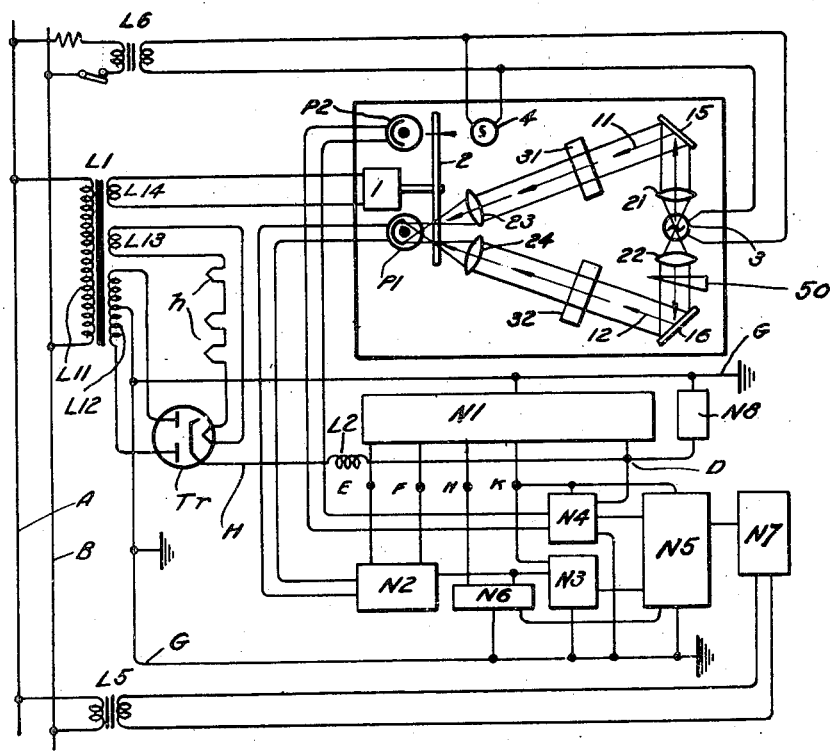

June 8, 1948. E. C. THOMSON 2,442,910
ELECTRONIC COMPARATOR DENSITOMETER
Filed June 24, 1944 4 Sheets-Sheet 1

Inventor
E. Craig Thomson
By Rudolf Ramany
Attorney

June 8, 1948.   E. C. THOMSON   2,442,910
ELECTRONIC COMPARATOR DENSITOMETER
Filed June 24, 1944   4 Sheets-Sheet 3

Inventor
E. Craig Thomson
By [signature]
Attorney

Inventor
E. Craig Thomson
Attorney

Patented June 8, 1948

2,442,910

UNITED STATES PATENT OFFICE 2,442,910

ELECTRONIC COMPARATOR DENSITOMETER

Elihu Craig Thomson, Boston, Mass., assignor to Photoswitch, Incorporated, Cambridge, Mass., a corporation of Massachusetts Application June 24, 1944, Serial No. 541,996

13 Claims. (Cl. 88—14)

This invention relates to apparatus for electrically measuring varying values of a physical phenomenon which can be expressed or detected in terms of impedance changes, as proportionately compared to another impedance or impedances which may represent other manifestations of the physical phenomenon or which may serve as a standard of comparison.

It is the main object of the invention to provide a measuring or controlling circuit which permits the continuous exact determination of the ratio of two or more electrical values, this measurement being unaffected by extraneous variations such as fluctuations of a test energy source, of supply voltage, or of changes in characteristics of electron discharge devices.

In other aspects of my invention, some of its objects are to provide an electronic circuit which permits the comparison as well as absolute evaluation of signals applied thereto through a single input channel; to provide a circuit which permits exact measurement of the ratio or ratios of two or more varying impedance values as well as absolute measurement of an impedance value as compared to a constant standard of comparison; to provide a circuit for comparing two radiation intensities derived from a source of radiation while compensating for unintended fluctuations of the source; to provide a circuit wherein two varying signal series are modified by keeping one of them constant, in such a manner that the absolute measured value of the other expresses the ratio between the two signals; to provide a switching and rectifying circuit which permits reliable separation and individual evaluation of several intermingled series of signals; to provide a circuit which permits in simple and effective manner discrimination between two or more series of signals in a single transmission channel; to provide a circuit wherein this discrimination is accomplished by a switching network which is steered by the signal-sending instrumentality and hence inherently in synchronism with the signal series proper; to provide a circuit of this type wherein the above-mentioned signal series are related to a common reference level; and generally to provide apparatus of the type described which is comparatively simple and rugged and yet very exact and adaptable to didiversified specific detection and measuring problems of the above-indicated general type.

In accordance with one of the principal features of the invention, these objects are accomplished by varying the conducting characteristics of a detecting element proportionate to several manifestations of a physical phenomenon during alternate strictly separated series of periods, by amplifying all series in a common transmission channel, by separating the several series or combinations of series with a switching device that alternately feeds the series into corresponding load impedances, controlling the common amplification of all series or combinations of series with a gain-control arrangement derived from one load impedance and set to keep the signal effect of that load impedance constant, and measuring the signal in the other load impedance or impedances.

Other features of the invention are, in one of its embodiments, the alternate relating of the detecting impedance to one or the other manifestation as well as the operation of the switching device, with a single element such as a shutter admitting one or the other light beam from a common source to a phototube and at the same time cyclically varying the illumination of a switching phototube; the use of a switching rectifier tube circuit with a branched load circuit that receives the combined signal series but directs selected series to one or the other branch under the influence of switching grids; by a voltage-doubling rectifier which relates the two unseparated series to a single reference level; a network applying one load impedance to the gain control and another or several to a measuring or indicating device such as a meter or oscillograph; and various network arrangements appropriately correlating the various circuit elements some of which may be omitted or modified according to the particular requirements of the problem at hand.

Figure 3:
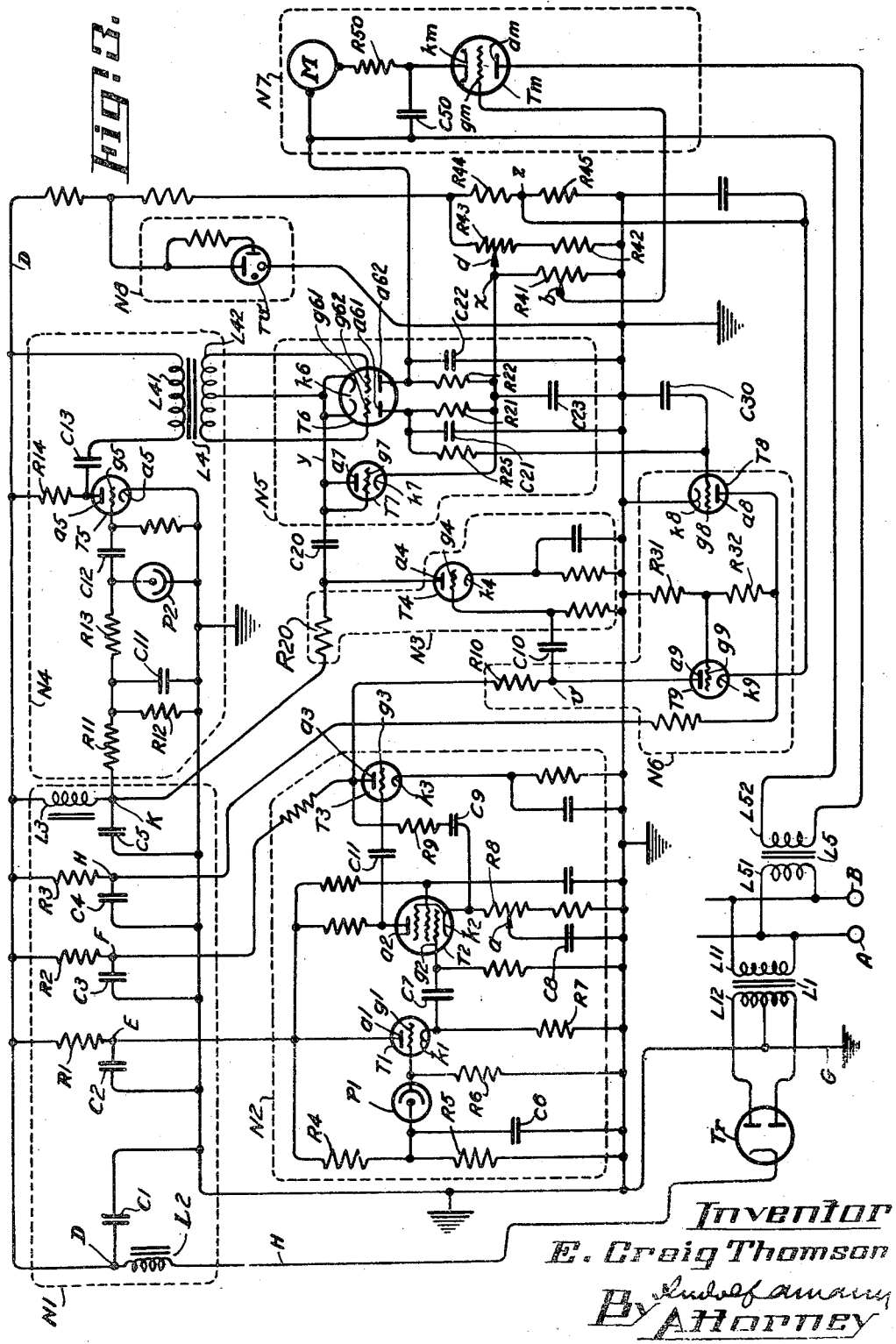
Figure 4:
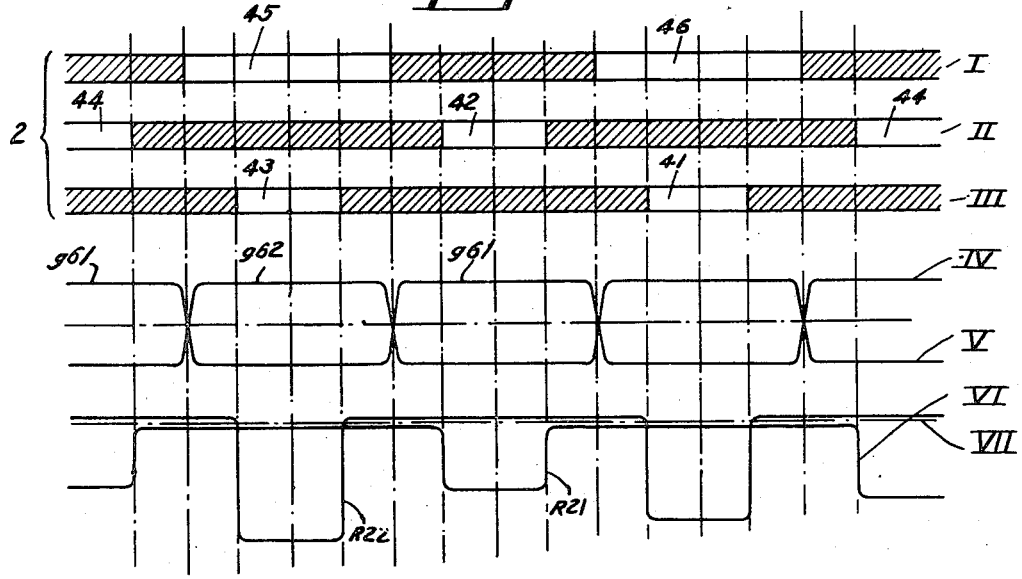
Figure 7:
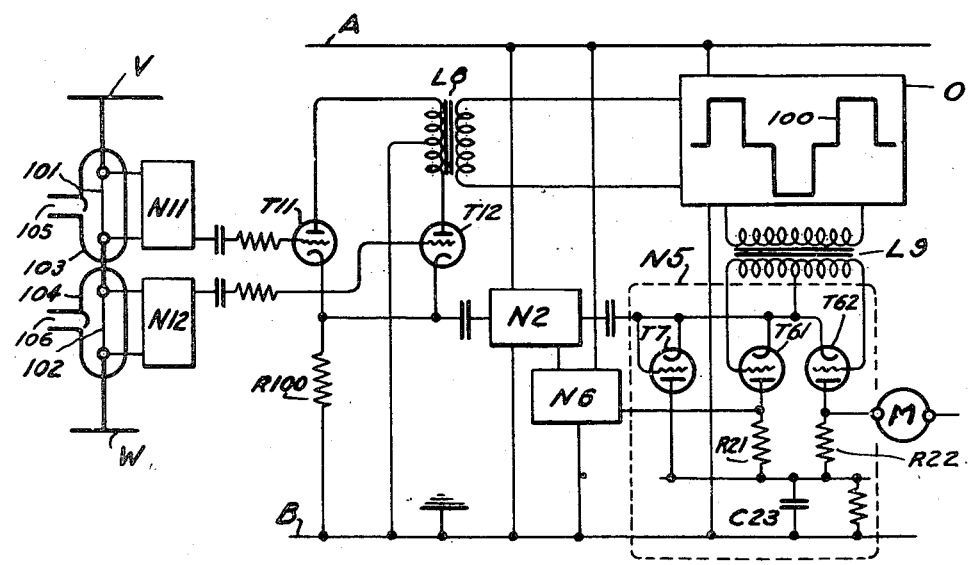
Figure 5:
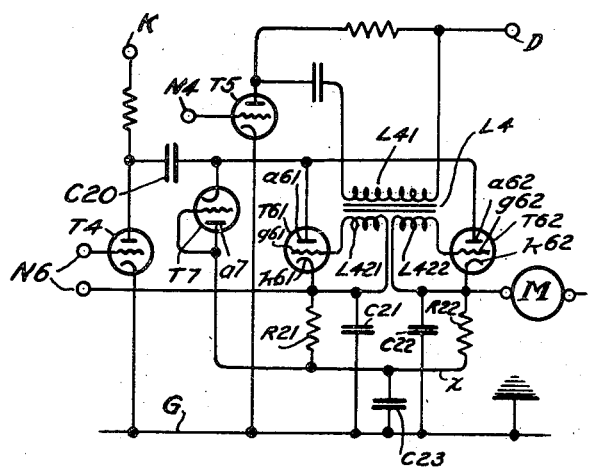
Figure 6:
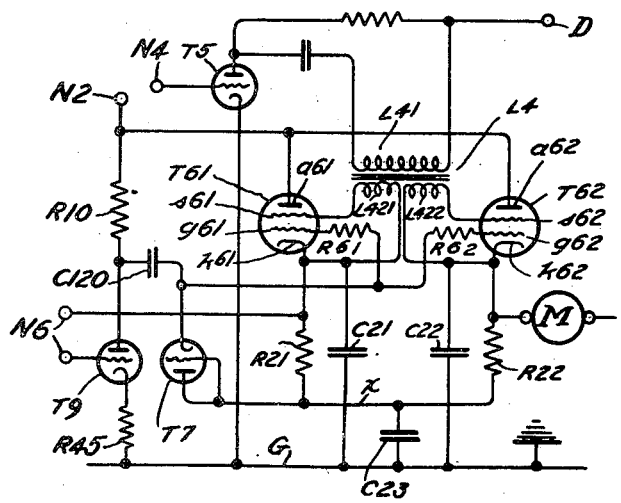

These and other objects, aspects and features will be more fully apparent from the following description of several practical embodiments illustrating the genus of the invention. The description refers to drawings in which Fig. 1 is a diagrammatic representation of measuring apparatus incorporating the invention;

Fig. 2 a view of the control shutter shown in Fig. 1;

Fig. 3 a detailed diagram of the circuit shown in Fig. 1 as a block diagram;

Fig. 4 a diagrammatical illustration of the correlated operation of the control shutter of Fig. 2 and of the circuit of Fig. 3;

Figs. 5 and 6 show two other embodiments of the switching circuit shown in Fig. 3; and Fig. 7 is a different embodiment of the detecting and switching arrangements shown in Fig. 1.

In Fig. 1, which incorporates all essential elements of a densitometer incorporating the present invention, A, B is an alternating current supply network which feeds into the primaries of transformers L1, L5 and L6.

Transformer L1 has three secondaries L12, L13, L14 which supply the motor 1 driving a control shutter 2, the heater elements $h$ of the various discharge tubes of the circuit, and a conventional rectifier arrangement including tube $Tr$ with grounded anode terminal wire G and cathode terminal wire H connected through choke L2 to direct current supply wire D.

Transformer L5 supplies alternating current to the measuring circuit N7 in the manner to be explained in detail below with reference to Fig. 3.

Transformer L6 feeds into a lamp circuit supplying measuring lamp 3 and switching lamp 4.

Two separate light beams 11, 12 are derived from lamp 3 and directed, by mirrors 15, 16 and lenses 21, 22, 23, 24 towards measuring phototube P1 which, in this embodiment, represents the detecting means whose conducting characteristic or effective impedance is varied. Two specimens 31, 32, a physical property of which is to be investigated in two respective manifestations (one of which may be a standard) are inserted in beams 11, 12, respectively. It will be noted that lenses 21, 22, 23, 24 are so arranged that the beams are collimated where they pass specimens 31, 32 but form foci at the rotatable control shutter 2 diverging sufficiently behind the shutter to fill the cathode of tube P1.

Lamp 4 illuminates switching tube P2, no particular beam forming provisions being ordinarily necessary between these two elements.

Shutter 2 has, as shown in Fig. 2, two apertures 41, 43 for beam 11, two apertures 42, 44 for beam 12 and two cut-outs 45, 46 for the switching light from lamp 4. It will be noted that, upon rotation by motor 1, the shutter will alternately, but with ample totally dark intervals between apertures 41, 42, 43, 44, admit light to tube P1 from beams 11 and 12 respectively, whereas cut-outs 45, 46 will change the illumination of switching tube P2 during these dark intervals.

It will be apparent that the shutter might have only one, or more than two apertures for each measuring beam, and one or more than two cut-outs for the switching beam; also other than flat disk shutters may be used as for example cylindrical shutters surrounding either lamps 3, 4 or tubes P1, P2, and suitably synchronized with each other. It will also be apparent that the shutter or shutters can be designed for controlling more than two measuring beams, in the manner to be discussed more fully hereinbelow.

The measuring phototube P1 is connected to a voltage amplifier circuit N2 which, like the other component circuits, is supplied from a decoupler network N1 having output points D, E, F, H, K, and feeds into a power amplifier N3. The switching phototube P2 feeds into switching amplifier N4.

Both amplifiers N3 and N4 are connected to the signal separating circuit N5 which contains two load impedances to each of which is applied a respective one of the signal series from N3, by means of switching impulses derived from N4 and synchronized with the signal series, due to the common origin at control shutter 2 of the alternation of the signal series as well as the timing of the switching impulses.

The voltage across one load impedance of circuit N5, representing the light transmission of one of the specimens, is used to operate a gain-control circuit N6 which modifies both measuring signal series, at a point between amplifier circuits N2 and N3, in such a manner that the voltage across that load impedance remains constant.

The voltage across the other load impedance of N5 is applied to a measuring circuit N7.

A voltage-regulating circuit N8 is inserted between direct current supply lines D and G.

Assuming the general case that all specimens as represented by samples 31 and 32 are variable and that the detecting intrumentalities, as for example lamp 3, are subject to change, the signal amplitudes $x$, $y$ of the two alternate series can be expressed as functions of the lamp intensity $u$.

$$x = f_1(u) = mnk_1 u$$

and $$y = f_2(u) = mnk_2 u$$

wherein $m$, $n$ and $k_1$, $k_2$ are variables namely $m$ the controllable gain characteristic of the amplifier, $n$ an uncontrollable tube and line voltage characteristic and $k_1$, $k_2$ the transmission characteristics of the specimens in beams 11 and 12, repectively.

We wish to measure $x$ as a function of the ratio $k_1/k_2$ only, with $u$ and $n$ unknown and uncontrollable. However, since the functional relationship between $u$, $n$ and $x$ or $y$ is the same in the respective beams, we can substitute $$mnu = \frac{y}{k_2}$$

in the above expression for $x$, and obtain $$x = y\frac{k_1}{k_2}$$

Since $y$ is postulated to be retained constant by the gain control according to the invention, we have $mnuk_2 =$ constant and $$x = c\frac{k_1}{k_2}$$

as required.

The condition $mnuk_2 =$ constant is fulfilled by adjusting gain $m$ in such a manner that variations in $k_2$ are compensated.

If $y$ is inherently constant as by putting a standard specimen or no specimen at all in one of the beams, then the last-mentioned condition is reduced to $y = mnu =$ constant and $x = ck_1$, which means that the gain control $m$ only has to compensate the fluctuations $n$ and $u$ but does not have to provide for a ratio measurement by keeping one (as $k_2$) of the two values $k_1$ and $k_2$ constant.

The above-outlined apparatus and measuring technique will now be explained more in detail with reference to Fig. 3.

The above-mentioned supply line A, B, transformers L1 and L5, and rectifier tube $Tr$ with input choke L2 are also shown in Fig. 3.

The decoupler circuit N1 contains, in well-known manner, filter resistors R1, R2, R3, filter choke L3, main filter condensers C1, C5, and filter condensers C2, C3 and C4 connected between ground and supply points D, E, F, H, K. These elements are so dimensioned as to apply the proper voltages to the circuit elements connected to the respective supply points, and to suppress or deviate undesirable frequencies.

Voltage amplifier circuit N2 contains phototube P1 whose anode is connected between resistors R4, R5 of a voltage divider between ground and supply point E, and provided with a filter condenser C6. The phototube P1 is coupled with the aid of resistor R6 to tube T1 which is connected as a cathode follower tube with load resistor R7. The signal appearing across R7 is through coupling capacitor C7 applied to grid $g2$ of voltage amplifier tube T2 whose cathode $k2$ lies on ground through resistor R8 with variable by-pass through condenser C8 on tap $a$. Anode $a2$ is connected to grid $g3$ of tube T3, supplied from F, through capacitor C11, and cathode $k2$ is connected to anode $a3$ of T3, through degenerative feedback capacitor C9 and resistor R9.

Tube T3 feeds into grid $g4$ of power amplifier tube T4 through resistor R10 of gain-control circuit N6 (constituting with tube T9 of that circuit a regulating potential divider) and capacitor C10. This power amplifier circuit N3 is supplied from point K of the decoupler circuit and is coupled to the signal rectifying and comparing circuit N5 through transmitting load impedance R20 and capacitor C20.

The switching amplifier circuit N4 contains phototube P2, supplied from K through voltage divider resistors R11, R12 and filter capacitor C11 and connected to grid $g5$ of an amplifier tube T5 through capacitor C12. It will be noted that the circuits of P1 and P2 are similar, but with load resistors R6 and R13 exchanged for the respective phototubes.

The anode of amplifier tube T5 is connected through load resistor R14 to supply point D. Resistor R14 is bridged by primary L41 of transformer L4, which is in series with a capacitor C13. Secondary L42 is with its end terminals connected to grids $g61$, $g62$ of duplex tube T6 (replaceable of course by two separate tubes) whose cathode $k6$ is at signal input wire $y$ connected to the midpoint of secondary L42 and to coupling capacitor C20. Anodes $a61$, $a62$ are connected, through load resistors R21, R22 to comparator wire $x$ which leads to tap $d$ of a voltage divider R43 as well as to cathode $k7$ of leveling tube T7 whose grid $g7$ and anode $a7$ are joined to wire $y$.

Load impedance R21 is connected to the grid $g8$ of the first tube T8 of gain-control circuit N6 through filter R25, C21 and C30, and load impedance R22 is connected to meter circuit N7.

Voltage apportioning resistors R41, R42, R43, R44 and R45 provide the potentials for proper operation of meter tube $Tm$ from tap $b$, of the gain-control circuit from tap $z$ and of comparator wire $x$ from tap $d$.

The gain-control circuit N6 comprises the above-mentioned amplifier tube T8 supplied from point H and having a load circuit R31, R32 connected to grid $g9$ of gain control tube T9 which is connected between tap $z$ and junction point $v$ at the above-mentioned control resistor R10, to which point $v$ is also connected coupling condenser C10 leading to power amplifier N3.

The measuring circuit N7 comprises a tube $Tm$ supplied with alternating current from secondary L52 of transformer L5. The grid $gm$ is connected to tap $b$ and the cathode $km$ to the variable potential terminal of load impedance R22. A milliamperemeter M is connected to tube $Tm$ through resistor R50 and capacitor C50.

In order to retain the voltage between ground and wire $x$ constant, a conventional voltage regulator circuit N8 with tube $Tv$ of type OA4G is preferably provided.

The impedances not expressly mentioned above are conventional bias or filter resistors and capacitors whose purpose will be evident to those skilled in the art.

The electron discharge devices may be individual tubes or component systems of multiple tubes; thus it was found that tubes T3 and T9, and T7 and T8 respectively, may be combined in two tubes of the 7F7 type, and that tubes T4 and T5 may be combined in a tube of type 7N7. Tube T1 may be of type 7B4, tube T2 of type 7C7, and tubes T6 and $Tm$ of type 7F7.

The circuit according to Fig. 3 operates as follows:

The current through phototube P1 is rhythmically increased during the alternate series of illumination periods when the tube is exposed to beams 11 and 12, the amplitudes of the impedance changes being proportionate to the transmission characteristics of specimens 31 and 32, respectively. Each increase in illumination of P1 proportionately raises the grid potential of tube T1 and the plate current of T1 correspondingly increases. Tube T1 belongs to a cathode-follower stage which does not provide amplification but decreases the effective impedance of the phototube circuit so that this stage stabilizes amplification, making it more independent of tube characteristics and supply voltage, thus increasing the range of the instrument.

The cathode-follower arrangement permits the use of a resistance R6 of comparatively high value and minimizes the effect of the shunt capacitance, so that high dropping speeds may be used without impairing the wave form of the signal coming from P1; excessive shunt capacity would tend to round off the desirable square shape of the signal impulses provided by apertures 41, 42, 43, 44 of control disk 2.

The signal appearing across resistor R7 is transmitted to grid $g2$ of T2 by alternating current-coupling means including capacitor C7, and amplified in tubes T2 and T3 which are coupled through capacitor C11 and arranged for variable cathode feedback which can be manually controlled through adjustable resistor R8 that permits adjustment of cathode by-pass through condenser C8.

Resistor R9 and condenser C9 provide for additional feedback from the plate circuit of tube T3, which feedback is degenerative and hence further stabilizes the operation of the amplifier.

Tube T3 feeds into a load impedance which is in effect a voltage divider, consisting of resistor R10 and tube T9 of gain-control circuit N6; the effective resistance of the arm T9 of this divider is controlled by its grid potential which is derived from load resistor R21 as will be explained below.

The two signal series, now represented by the potential variations of point $v$ are fed through the alternating current coupling link constituted by condenser C10, into tube T4 of the power amplifier.

The output of tube T4 is coupled through capacitor C20 to the half-wave rectifier tube T7 which, together with condenser C20 establishes a zero voltage reference line at the extremity of the positive peak of the signal wave by preventing wire $y$ from becoming positive with respect to point $x$, so that the entire wave is negative with respect to that point, tube T6 thereby rectifying the entire wave, peak to peak. Since the cathode of T7 is connected to wire $x$, the signal appears between points $x$ and $y$ as a train of negative half waves with the potential of $x$ as reference point carrying as uniform potential or base line what would ordinarily be the positive peak voltage, and wire $y$ carrying the varying negative potential of both series of alternate signal impulses.

The phototube P2, controlled by cut-outs 45, 46 of the control shutter, is connected in an amplification circuit N4 similar to N2, but with load resistor and tube interchanged, but the conductivity of tube T5 is also increased when phototube P2 is illuminated because the load is in the anode circuit. Tube T5 feeds into the primary L41 of transformer L4, whose secondary L42 is connected to switching tube T6. Capacitor C13, resistor R14 and transformer L4 are so dimensioned that they will produce in secondary L42 a voltage which is a faithful reproduction of the voltage drop across R14. Ordinarily this condition calls for comparatively high values of C13 and L41.

Depending upon the direction of current flow in secondary L42, grids $g61$ and $g62$ are alternately positive and negative and accordingly control the conductivity of the two load circuits of tube T6 which include load resistors R21 and R22, respectively.

This switching of conductivity from one side of tube T6 to the other is synchronized with the switching signal from P2 and the measuring signal from P1, as indicated in Fig. 4, in such a manner that the grid $g61$ is positive and anode $a61$ effectively conducting, when the measuring signal through load resistor R21, responsive to the varying light on P1, is applied to tube T6. In Fig. 4, strips I, II and III represent the apertures and cut-outs of control shutter 2, curves IV and V the potentials of grids $g61$ and $g62$, respectively, and curves VI and VII the voltages across load resistors R21 and R22, respectively.

It will now be evident that the voltage drop in resistor R22 is proportionate to the magnitude of the illumination of flux transmitted through specimen 31 whereas the drop in resistor R21 is proportionate to that transmitted through specimen 32. In accordance with the invention, one of these voltages, for example that across R21 is maintained constant, in order to maintain the original proportionality between the two signal series regardless of undesired effects such as fluctuations of the light emitted by lamp 3, and in order to permit derivation of the ratio of the two signals by measuring one of them. For this purpose, automatic gain control is provided by circuit N6, whose operation will be described hereinbelow.

The voltage across resistor R22 is applied to tube $Tm$ which is connected as a cathode-follower tube so that the voltage across resistor R50 is proportionate to that across resistor R22 but, due to the current amplification of tube $Tm$, supplies sufficient current to drive the indicating meter M with substantial movement.

Since tube $Tm$ derives its plate supply from secondary L52 of transformer L5, this alternating current voltage being referred to the anode $a62$ of tube T6, and since $Tm$ conducts only one half cycle of this alternating current, condenser C50 is used to bypass the resulting alternating current component in resistor R50, around the meter. The meter M therefore indicates the voltage across resistor R22 which, as above explained, is proportionate to the density of the specimen in beam 31.

The above-mentioned gain-control circuit N6 operates as follows.

The values of capacitors C21 and C22 are so selected that they charge to the peak values of the respective signal series as appearing across resistors R21 and R22, minus the voltage between wire $x$ and ground, and the voltage between wire $x$ and ground is so chosen that the voltage between $a61$ and ground is zero for a selected intensity of beam 32; if the specimen in that beam is a standard this voltage will be adjusted to zero for normal intensity of lamp 3. If the intensity of beam 32 (the $u$ in the above equations) increases (as factor $n$ or $k_2$ changes), the peak intensity of the respective signal (the $x$ in the equations) also increases and grid $g8$ of tube T8 in circuit N6 becomes more negative as compared to cathode $k8$, this cathode being on ground whereas grid $g8$ receives a voltage due to the charge on capacitor C30 through resistor R25. Tube T8 becoming less conductive, its plate potential rises and drives grid $g9$ of tube T9 less negative so that the internal resistance of T9 decreases, lowering the potential of point $v$, thus reducing the amplitudes of both signal series, before they are fed into the power amplifier, so that the difference of the voltages across resistor R21 and $x$ to ground is restored to zero, plus enough bias on T8 to maintain this condition. This bias is usually negligible as compared to the voltage across resistor R25.

Condensers C23 and C30 are filter condensers which, in conventional manner, retard the response of the gain-control circuit in order to avoid oscillating and hunting. Furthermore, the capacitors C21 and C22 are preferably chosen large enough so that they do not immediately discharge after a signal impulse applied to one of their respective resistors R21 or R22 has ceased to exist.

It will now be evident that constant voltage between point $x$ and ground is essential for the proper operation of this circuit. In order to maintain this constancy, a conventional voltage regulator circuit N8 with tube $Tv$ is provided.

Resistor R41 has the purpose of adjusting the zero point of the meter, by inserting a fixed amount of bias in the grid circuit of meter-operating tube $Tm$.

Resistor R43 has the purpose of adjusting the fixed or standard voltage between $x$ and ground, to provide full-scale reading of the meter at any desired signal magnitude. The meter scale is spread by increasing the voltage between $x$ and ground. The same effect can be obtained by decreasing the intensity of that signal series whose magnitude is automatically maintained constant. In the instance of the circuit shown in Fig. 3 this is the signal series appearing across resistor R21. This adjustment can be obtained optically by inserting an optical wedge filter in the beam corresponding to that signal series, in the present instance beam 12. Such a wedge is indicated at 50 of Fig. 1.

Instead of using the switching and signal-comparing circuit N5 described with reference to Fig. 3, other arrangements serving this purpose may be used, for example those indicated in Figs. 5 and 6 which as far as feasible carry the identification marks of corresponding elements of Fig. 3.

In Fig. 5, grid-controlling secondaries L421 and L422, corresponding to secondary L42 of Fig. 3, are arranged between grids $g61$ and $g62$ and separate cathodes $k61$ and $k62$. Accordingly, tube T7 is reversely connected, with its anode $a7$ on wire $x$. This arrangement has the advantage, if a suitable source of constant voltage which is negative with respect to ground is available, it is possible to eliminate phase-reversing tube T8 and operate directly into grid g9 from the connection to cathode k61, since signal voltages are positive with respect to line x in this circuit.

The arrangement shown in Fig. 6 uses two control grids for each rectifier branch; one pair, s61 and s62 respectively for the function performed by the grids of tubes T6, and T61 and T62 of Figs. 3 and 5, respectively, namely for blocking one or the other alternate signal series, and the other pair g61 and g62 for proportionately adjusting the conductivity of the respective tubes. This latter function is a cathode-follower current amplification and may replace that of power amplifier N3 so that, as indicated in Fig. 6, circuit N5 can be directly connected to circuit N6 with condenser C120 assuming the functions of condenser C10 of Fig. 3. It will now be evident that the blocking grids s61 and s62 are controlled by circuit N4 through transformer L4, similarly as according to Figs. 3 and 5, and that grids g61 and g62 are impressed with the high-impedance signal output of voltage amplifier N2, through resistors R61 and R62 to eliminate excessive grid current during the periods when the tube is blocked. It will be evident that this modification constitutes a simplification of the circuit according to Fig. 3.

Instead of comparing the magnitudes of two physical properties, as for example those detected by beams 11 and 12, the signal series and the switching impulses may be so correlated that for example the sum of two signals, say 11 plus 12, is compared with a single signal, say 12, so that the sum of two values, or the ratio of the sum of two values to one of these values can be directly measured.

If the shutter is so arranged that both beams are uncovered alternately with the uncovering of only one beam, for example that corresponding to signal amplitude $x$, it is possible to measure the ratio $$\frac{k_1}{k_2+k_2}$$

where again $x = mnk_1u$.

If a signal $x + y$ is established by simultaneously uncovering both beams during the period when previously signal $y$ alone was established, then $x+y=mnk_1u+mnk_2u=mnu(k_1+k_2)$ or with $x+y=c=$constant, $$x = c\frac{k_1}{k_1+k_2}$$

provided that $m$ is again adjusted to retain $mnu(k_1+k_2)=$constant.

As indicated above, the arrangement according to the invention may be also used with more than two alternate signal series; considering for example the detecting and sending device according to Fig. 1, three instead of two beams may be derived from lamp 3 and the signal impulses so arranged that the three signal series are applied to three load impedances corresponding to R21 and R22 of Fig. 3. If the automatic gain-control impedance is derived from a series and beam which represent a constant standard, two varying values can then be read from meters connected to the two other load impedances, while any incidental fluctuations, such as due to variations of lamp 3, are inherently compensated.

Instead of the signal-detecting and sending device shown in Fig. 1, different arrangements may be used in accordance with the purpose at hand. Fig. 7 shows by way of example an arrangement for the comparative or compensated measurement, according to the principle of the invention, of the varying effective impedance of two detecting elements represented by the two incandescent wires used according to Pirani (Trans. Am. Electrochem. Soc., vol. 20, 1911, page 243) for measuring gas pressures through the intermediary of the heat conductivity of the gas or gases in question.

In Fig. 7, numerals 101 and 102 indicate two Pirani wires, supplied from wires V, W, within vessels 103 and 104 which have tubes 105 and 106 connecting them with the tanks or conduits containing the gas or gases to be tested. The voltages across wires 101, 102 are supplied to amplifiers N11, N12, whose output is applied to the grids of two selecting tubes T11, T12, respectively. The plates of these tubes may be supplied from a source O, for example a suitable oscillator or electromagnetical generator, furnishing through transformer L8 current having the wave shape indicated at 100 of Fig. 7. The common output circuit of tubes T11, T12 is coupled to an amplifier N2 which corresponds to amplifier N2 of Fig. 3 and which feeds into a comparing circuit corresponding to N5 of Fig. 3, the grids of tubes T61 and T62 being connected to transformer L9 furnishing current which is synchronized with and in suitable phase relation to that supplying tubes T11 and T12.

Tubes T11 and T12 apply to load R100 two series of alternating signal cycles, the amplitudes of one series being proportionate to the resistance of wire 101, the other to that of wire 102, but both being in the same channel.

Both signal series are applied to amplifier N2 and to switching and signal-comparing circuit N5 which separates the signal series and applies the one appearing on R21 to gain-control circuit N6 and that on R22 to meter M, in the manner described above with reference to Fig. 3. It will now be apparent that any undesired fluctuations, such as heating current variation, are thus compensated for by proportionately varying the respective intensities of both signal series to a degree adapted to retain the amplitude of the signals of one series constant and by measuring the signal amplitude of the other series, whereby the ratio of the two signals can be continuously measured while unintended variations introduced by the measuring apparatus are compensated for.

Instead of the embodiments shown in Figs. 3 and 5 for the switching circuit N5, with the signal input applied to anode-cathode circuits and the blocking voltage to control electrodes, an arrangement similar to that shown for tubes T11 and T12 of Fig. 7 may be used, with the synchronized steering impulses applied to the anode-cathode circuit and the signal input to control grids, similar to the arrangement of Fig. 6.

It will be understood that the meter M of devices of the present type can be replaced by or operated together with signal devices, relays, or other control apparatus, for the purpose of continuously controlling a manufacturing phase which affects the value of the physical property that is supervised with the aid of the device.

It should be understood that the present disclosure is for the purpose of illustration only and that this invention includes all modifications and equivalents which fall within the scope of the appended claims.

I claim:

1. An electronic circuit for measuring the relative magnitudes of two manifestations of a physical phenomenon, comprising detecting means;

signal-applying means for varying the effective impedance value of said detecting means during two series of alternate cycle periods proportionate to a property of respective ones of said manifestations; two electron discharge means having control grids, two load circuits associated with respective ones of said grids, each circuit including a measuring impedance responsive to the impedance value of said detecting means during one of said series; means associated with said signal-applying means and in circuit with said grids for blocking one load circuit during one of said series and the other load circuit during the other series; means associated with one of said load circuits for adjusting the currents in said load circuits proportionate to each other such as to maintain the voltage of the measuring impedance of said one load circuit substantially constant; and indicating means associated with the measuring impedance of the other load circuit.

2. An electronic circuit for measuring the relative magnitudes of two manifestations of a physical phenomenon, comprising detecting means; signal-applying means for varying the effective impedance value of said detecting means during two series of alternate cycle periods proportionate to a property of respective ones of said manifestations; two electron discharge means having control grids, two load circuits associated with respective ones of said grids, each circuit including a measuring impedance responsive to the impedance value of said detecting means during one of said series; means associated with said signal-applying means and said grids for blocking one load circuit during one of said series and the other load circuit during the other series; means for retaining a terminal of each of said measuring impedances at the same potential level; means asociated with one of said load circuits for proportionately adjusting the potentials from said level so as to maintain the potential of the other terminal of the measuring impedance of said one load circuit substantially constant; and indicating means associated with the other terminal of the measuring impedance of the other load circuit for measuring the potential of its measuring impedance above said level.

3. An electronic circuit for measuring the relative magnitudes of two manifestations of a physical phenomenon, comprising a single detecting means, signal-applying means for varying the effective impedance of said detecting means during two series of alternate cycle periods proportionate to a property of respective ones of said manifestations, electron discharge means adapted to be controlled by said detecting impedance means and having two load impedance means adapted alternately to carry currents during said periods proportionate to the prevailing value of the signals applied to said detecting means, cycle-selecting means associated with said signal-applying means for rendering one of said load impedance means responsive exclusively to said property of one of said manifestations during one of said series and the other load impedance means to that of the other manifestation during the alternate series, and means in circuit with said load impedances for quantitatively comparing the load-energy values of the two series.

4. An electronic circuit for measuring the relative magnitudes of the light transmission of two specimens, comprising a photoelectric detecting means arranged for illumination by a light affected by said specimens, signal-applying means including shuttering means in the light illuminating said detecting means, for varying the effective impedance value of said detecting means during two series of alternate cycle periods of illumination proportionate to the respective light intensities of said series, electron discharge means adapted to be controlled by said detecting means and having two load impedance means adapted alternately to carry currents during periods proportionate to the prevailing value of said impedance, cycle-selecting means associated with said signal-applying means for rendering one of said load impedance means exclusively responsive to the transmission of one of said specimens during one of said series and the other load impedance means to that of the other specimen during the alternate series, and means in circuit with said load impedances for quantitatively comparing the load-energy values during consecutive ones of said periods.

5. Electronic measuring apparatus for comparing the effective impedance values of a detecting element during one series of cycle periods with the values of the same element during an alternate series of cycle periods, comprising an electronic circuit arranged for amplifying variations in the current through said element during both series and including at an intermediate stage a potential apportioning load impedance adapted to control the gain of said amplifying circuit; a switching impulsor adapted to furnish an alternating potential in synchronism with said cycle series; an electron discharge means having two grids connected to said impulsor and two anode circuits supplied by the output of said amplifying circuit and controlled respectively by said grids and each having a load impedance, one grid being supplied by said impulsor during one of said series with a potential blocking current flow through its anode circuit and the other grid being similarly supplied with a potential blocking current flow through its anode circuit during the other series; an electronic amplifier whose input circuit is controlled by one of said load impedances, which feeds into and is arranged to vary the potential distribution on said apportioning impedance, and hence the gain of said amplifying circuit, to keep the voltage drop across said one load impedance substantially constant; and means for measuring the voltage drop across the other load impedance.

6. Electronic measuring apparatus for comparing the light transmission values of two specimens, comprising a light source; a phototube; means for defining two separate light beams from said source to said phototube and each containing one of said specimens; a rotating shutter admitting one of said beams to said phototube during one series of cycle periods and the other beam during an alternate series of cycle periods; an electronic circuit arranged for amplifying the current through said phototube during both series and including at an intermediate stage a potential apportioning load impedance adapted to control the gain of said amplifying circuit; a second phototube arranged for illumination by a light beam cyclically obstructed by said shutter in synchronism with said series and for changing the effective impedance of said second phototube in the intervals between illumination periods of said first phototube; a switching amplifier energized by said second phototube for furnishing an alternating potential in synchronism with the impedance changes of said second phototube; an electron discharge tube having two grids connected to said switching amplifier and two anode circuits supplied by the output of said amplifying circuit and controlled respectively by said grids and each having a load impedance, one grid being supplied by said switching amplifier during one of said series with a potential blocking current flow through its load circuit and the other grid being similarly supplied with a potential blocking current flow through its load circuit during the other series; an electronic amplifier whose input circuit is controlled by one of said load impedances, said amplifier feeding into and being arranged to vary the potential distribution on said apportioning impedance, and hence the gain of said amplifying circuit, to keep the voltage drop across said one load impedance substantially constant; and means for measuring the voltage drop across the other load impedance.

7. An electronic circuit for measuring the relative magnitudes of the light transmission of two light beams, comprising a photosensitive element arranged for illumination by said beams; signal-applying means including a shutter in said light beams, for varying the effective impedance value of said element during two series of alternate cycle periods proportionate to respective light intensities of said beams, grid-controlled electron discharge means having two load circuits associated with respective ones of said grids and each including a measuring impedance for measuring the impedance of said element during one of said series; circuit means constructed and arranged to carry current which is cyclically controlled by said shutter and an amplifier energized by said circuit means for controlling said grids for blocking one load circuit during one of said series and the other load circuit during the other series; means controlled by one of said load circuits for adjusting the currents in both said load circuits so as to maintain the voltage drop across the measuring impedance of said one load circuit substantially constant thereby maintaining a constant ratio between the voltage drops across said measuring impedances; and indicating means associated with the measuring impedance of the other load circuit.

8. Electronic measuring apparatus for comparing the effective impedance values of a detecting element during one series of cycle periods with the values of the same element during an alternate series of cycle periods, comprising an electronic circuit arranged for amplifying the current through said element during both series and including at an intermediate stage a potential apportioning load impedance adapted to control the gain of said amplifying circuit; a switching impulsor adapted to furnish an alternating potential in synchronism with said cycle series; an electron discharge means having two grids connected to said impulsor and two anode circuits supplied by the output of said amplifying circuit and controlled respectively by said grids and each having a load impedance, one grid being supplied by said impulsor during one of said series with a potential blocking current flow through its anode circuit and the other grid being similarly supplied with a potential blocking current flow through its anode circuit during the other series; an electronic amplifier whose input circuit is controlled by one of said load impedances, which feeds into and is arranged to vary the potential distribution on said apportioning impedance, and hence the gain of said amplifying circuit, to keep the voltage drop across said one load impedance substantially constant; filtering means for maintaining the input voltage to said electronic amplifier substantially free of alternating current variations; and means for measuring the voltage drop across the other load impedance.

9. Electronic measuring apparatus for comparing the light transmission values of two specimens, comprising a light source; a phototube; means for defining two separate light beams from said source to said phototube and each containing one of said specimens; a rotating shutter admitting one of said beams to said phototube during one series of cycle periods and the other beam during an alternate series of cycle periods; an electronic circuit arranged for amplifying the current through said phototube during both series and including at an intermediate stage a potential apportioning load impedance adapted to control the gain of said amplifying circuit; a second phototube arranged for illumination by a light beam cyclically obstructed by said shutter in synchronism with said series and for changing the effective impedance of said second phototube in the intervals between illumination periods of said first phototube; a switching amplifier energized by said second phototube for furnishing an alternating potential in synchronism with the impedance changes of said second phototube; an electron discharge tube having two grids connected to said switching amplifier and two anode circuits supplied by said amplifying circuit and controlled respectively by said grids and each having a load impedance, one grid being supplied by said switching amplifier during one of said series with a potential blocking current flow through its load circuit and the other grid being similarly supplied with a potential blocking current flow through its load circuit during the other series; an electronic amplifier whose input circuit is controlled by one of said load impedances, said amplifier feeding into and being arranged to vary the potential distribution on said apportioning impedance, and hence the gain of said amplifying circuit, to keep the voltage drop across said one load impedance substantially constant; filtering means for maintaining the input voltage to said electronic amplifier substantially free of alternating current variations; and means for measuring the voltage drop across the other load impedance.

10. Apparatus for measuring properties of a material which affect its radiation transmission, comprising a source of radiation, means sensitive to said radiation, means for directing radiation beams through two separate paths from said source to said sensitive means, shutter means arranged in said paths for alternately admitting to said sensitive means radiation from said paths with a substantial intervening totally obstructing period between consecutive admission periods, means for introducing a radiation-absorbing specimen of said material into at least one of said paths, and two measuring means associated with said sensitive means; and means energized during each of said obstructing periods and in response to the action of said shutter for rendering said measuring means alternately operative during said consecutive periods.

11. Apparatus for measuring properties of material which affect its radiation transmission, comprising a source of radiation; dtecting means sensitive to said radiation; means for directing radiation beams through two separate paths from said source to said sensitive means; shutter means arranged in said paths for alternately admitting to said detecting means radiations from said paths with substantial totally obstructing periods between consecutive admission periods; means for introducing radiation-absorbing specimens of said material into said paths; switching means adapted for operation in response to the action of said shutter and during said totally obstructing periods; and two means associated with said detecting means and rendered alternately operative by said switching means for separately evaluating the amplitudes of radiations changes caused by at least one of said specimens.

12. Apparatus for measuring properties of material which affect its radiation transmission, comprising a source of radiation; detecting means sensitive to said radiation; means for directing radiation beams through two separate paths from said source to said sensitive means; radiation sensitive switching means associated with a third radiation beam; shutter means arranged in said three beams for alternately admitting to said detecting means radiation from said paths with a substantial totally obstructing period between consecutive admission periods, and for varying during said obstruction period the radiation impinging on said switching means; means for introducing radiation-absorbing specimens of said material into at least one of said paths; selector means rendered operative by said switching means and two means associated with said detecting means and rendered alternately operative by said selector means for separately evaluating radiation values in said paths.

13. Apparatus for measuring properties of material which affect its radiation transmission, comprising a source of radiation; main detecting means sensitive to said radiation; means for directing radiation beams through two separate paths from said source to said detecting means; a second source of radiation; auxiliary detecting means sensitive to and arranged to receive radiation from said second source; a rotatable shutter arranged between said sources and said detecting means, said shutter having spaced apertures for admitting to said main detecting means two alternate series of radiation periods from one and the other of said paths, respectively, and for changing the illumination of said auxiliary means from said second source intermediate said periods; means for introducing radiation-absorbing specimens of said material into at least one of said paths; selector means rendered operative by said auxiliary detecting means and two means associated with said main detecting means and rendered alternately operative by said selector means for separately evaluating radiation values in said paths.

E. CRAIG THOMSON.

REFERENCES CITED

The following references are of record in the file of this patent:

UNITED STATES PATENTS

| Number | Name | Date |
|---|---|---|
| 1,881,336 | Voigt | Oct. 4, 1932 |
| 1,932,337 | Dowling | Oct. 24, 1933 |
| 2,032,128 | Horsfield | Feb. 25, 1936 |
| 2,066,934 | Gulliksen | Jan. 5, 1937 |
| 2,240,722 | Snow | May 6, 1941 |
| 2,324,270 | Schlesman | July 13, 1943 |

FOREIGN PATENTS

| Number | Country | Date |
|---|---|---|
| 636,170 | Germany | Oct. 5, 1936 |

OTHER REFERENCES

"Theory and Applications of Electron Tubes" by H. J. Reich; published 1939. Pages 597 and 598 cited. (Copy in Division 7, U. S. Patent Office.)